United States Patent Office 3,547,807
Patented Dec. 15, 1970

3,547,807
CONVERSION PROCESS AND CATALYSTS
Rowland C. Hansford, Yorba Linda, Calif., assignor to Union Oil Company of California, Los Angeles, Calif., a corporation of California
No Drawing. Continuation-in-part of application Ser. No. 343,932, Feb. 11, 1964, which is a continuation-in-part of application Ser. No. 150,129, Nov. 6, 1961, now abandoned, which in turn is a continuation-in-part of application Ser. No. 72,325, Nov. 29, 1960, and now abandoned. This application June 5, 1967, Ser. No. 643,353
Int. Cl. C10g 23/00
U.S. Cl. 208—111                                28 Claims

ABSTRACT OF THE DISCLOSURE

Hydrocracking catalysts are disclosed consisting essentially of a physical, particle-form mixture of (1) a crystalline aluminosilicate component having a sodium content of less than 4 percent by weight, and (2) a hydrogenation component comprising a predominant proportion of a porous support, other than a crystalline aluminosilicate, and a minor proportion of at least one constituent exhibiting hydrogenation activity. Hydrocracking processes using such catalysts are also disclosed.

PARENT APPLICATIONS

This application is a continuation-in-part of copending application Ser. No. 343,932, filed Feb. 11, 1964, which in turn is a continuation-in-part of Ser. No. 150,129, filed Nov. 6, 1961, now abandoned, which is in turn a continuation-in-part of application Ser. No. 72,325, filed Nov. 29, 1960, and now abandoned.

This invention relates to new catalysts for chemical conversions, and particularly to catalysts and methods for the hydrocracking of hydrocarbons, especially high-boiling mineral oil fractions, to produce lower boiling fractions such as gasoline or jet fuel. The new catalysts comprise as the essential active component, certain "decationized" zeolitic, crystalline molecular sieve cracking bases upon which is deposited a minor proportion of a transitional metal hydrogenating promoter. More specifically the molecular sieve cracking base is a hydrogen, or "decationized," form of certain crystalline, alumino-silicate zeolites characterized by a relatively uniform crystal pore diameter of between about 6 and 15 A., preferably 9 to 10 A. The hydrogenating promoter may comprise any one or more of the transitional metals, their oxides or sulfides, and particularly the metals of Group VI–B and Group VIII, and their oxides and sulfides. The hydrogenating promoter is preferably ion-exchanged into the molecular sieve lattice, but may be added by conventional impregnation methods if desired.

The combination of the zeolitic cracking base and the hydrogenating promoter may be pelleted and employed as such, but it is found preferable to admix and copellet the micro-crystalline catalyst with a relatively inert, porous adjuvant material having an average particle size substantially larger than the average size of the molecular sieve crystals, upon which is deposited a hydrogenating component. The copelleted catalysts containing the adjuvant are found to display a higher effective activity than an equal volume of the pelleted metal-zeolite component alone.

The catalysts of this invention are found to be considerably more active than conventional hydrocracking catalysts wherein the molecular sieve component is replaced by an ordinary amorphous silica-alumina, gel-type cracking base. Moreover, they appear to be much more selective in their activity, in that they induce very little coke and methane formation. As a result of the reduced coke formation, they are found to maintain their activity for long periods of time between regenerations.

A most surprising feature of the invention as applied to hydrocracking resides in the extremely high iso/normal paraffin ratios found in the $C_4$–$C_6$ product fractions. The catalysts of this invention possess excellent intrinsic isomerization activity for lower paraffins. It hence came as a distinct surprise to find that, in the presence of hydrocracking feeds, the isomerization activity was so inhibited that far higher than the thermodynamic equilibrium ratios of iso/normal paraffins were obtained.

An important feature of the process resides in the use of hydrocracking temperatures considerably lower than conventional, e.g., between about 450° and 800° F., and preferably between about 500° and 750° F. The efficacy of low temperatures in the process of this invention stems from the improved activity of the catalyst, and the selectivity of conversion is a concomitant result of the low temperatures used and the intrinsic selectivity of the catalyst.

It is a principal object of this invention to provide more efficient and selective hydrocracking catalysts which will effect a maximum conversion of the feed to gasoline-boiling-range hydrocarbons, and a minimum of destructive degradation to products such as methane and coke. Another object is to provide catalysts which will maintain their activity for longer periods on-stream, between regenerations. A specific object is to provide catalysts of inherently low coke-forming tendencies, whereby the hydrocracking may be conducted under relatively low hydrogen pressures, thereby minimizing utility costs and plant construction costs, and also minimizing the danger of explosive runaway reactions. Another object is to provide catalysts which are effective for the hydrocracking of refractory stocks such as cycle oils from conventional catalytic or thermal cracking operations, whereby additional conversion to gasoline may be obtained. Still another object is to provide catalysts which are active at low temperatures, thereby further minimizing the formation of coke, and extending the run length between regenerations. Other objects will be apparent from the more detailed description which follows.

Hydrocracking processes as known in the art suffer from several serious disadvantages. In general, such processes are carried out at high temperatures, in excess of about 850° F. These temperatures tend to favor dehydrogenation and coke, and hence to obtain any substantial hydrogenating effect from the added hydrogen, and to reduce the coking rate, it is necessary to employ relatively high pressures of, e.g., 3,000 to 8,000 p.s.i.g. A catalyst active at low temperatures would hence be highly desirable both from the standpoint of reducing the rate of coke deposition, and permitting the use of low pressures.

The practical utility of the catalysts of this invention becomes most apparent in fixed-bed operations. The principal and much sought after goal in these fixed-bed operations is to prolong the run length between catalyst regenerations. Where regeneration is required every few days, it is generally necessary to provide two reactors with double the amount of catalyst which is required for one reactor, so that one reactor will be on-stream while the other is being regenerated. Where the catalyst maintains its activity for several weeks, it is generally more economical to shut the plant down for regeneration than to provide a stand-by reactor. But, in any case, each regeneration is an expensive operation, and results in some irreversible damage to the catalyst. Hence, to achieve maximum total catalyst life and to minimize operational expenses, it is mandatory to achieve the maximum run length between regenerations.

Since a fresh catalyst generally displays maximum activity, and since relatively constant conversion and throughput are desired in commercial operations, it is the normal practice to start a run at a relatively low temperature, and as the catalyst becomes less active, to raise the temperature periodically so as to maintain the desired conversion. This procedure is continued until a terminal temperature is reached at which the rate of catalyst deactivation becomes exponential as a result of the accelerated deposition of carbonaceous deposits. The range between the initial and terminal temperatures may be from about 25° to 300° F. or more. It is thus evident that for a given set of conditions and feedstock, the run length will be determined by the permissible starting temperature. If a given conversion can be maintained with a 0.5° F. temperature rise per day, and the terminal temperature is 800° F., a 300-day run length can be achieved if the desired conversion can be initiated with the fresh catalyst at 650° F., but the run length will be only 100 days if the starting temperature must be 750° F.

Thus, the importance of catalyst activity at low temperatures becomes clearly apparent in such operations. It is contemplated herein to commence the hydrocracking runs at space velocities of about 0.5 to 5.0, and temperatures between about 450° and 600° F. to obtain 30 to 80% conversion to gasoline per pass, and continue to a terminal temperature of about 750° to 850° F., with at least half of the run being carried out at below about 750° F. Pressures between about 800 and 3,000 p.s.i.g. may be utilized, and run lengths of at least about 60 days are entirely feasible, and usually up to about 6 months or more. Such runs are generally not possible with conventional hydrocracking catalysts, except by resorting to uneconomically low space velocities in the range of about 0.1 to 0.4.

In the above or other types of hydrocracking operations, it is contemplated that the catalysts may be used under the following operating conditions:

|  | Operative | Preferred |
|---|---|---|
| Temperature, ° F | 450–850 | 500–750 |
| Pressure, p.s.i.g | 400–5,000 | 800–2,000 |
| LHSV | 0.2–10.0 | 0.5–5.0 |
| $H_2$/oil ratio, s.c.f./b | 1,000–20,000 | 3,000–10,000 |

The hydrocracking feedstocks which may be treated herein include in general any mineral oil fraction boiling above the conventional gasoline range, i.e., above about 300° F. and usually above about 400° F., and having an end-boiling-point of up to about 1,000° F. This includes straight-run gas-oils and heavy naphthas, coker distillate gas oils and heavy naphthas, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 650° F., having an API gravity of 20 to 35°, and containing at least about 30% by volume of acid-soluble components (aromatics+olefins).

The unique characteristics of the catalysts of this invention, including the improved activity and selectivity, are believed to stem principally from the physical and/or chemical properties of the zeolite cracking bases in their "decationized," or hydrogen, form. These crystalline zeolites are composed almost entirely of silica and alumina, the $SiO_2/Al_2O_3$ mole-ratio being between about 2 and 10, and preferably between about 3 and 6. Suitable examples include for example, the synthetic zeolites Y, L, X and the like, as well as natural zeolites such as chabazite, mordenite, faujasite and the like.

The preferred high-silica zeolites of this invention are more particularly described in U.S. Pat. No. 3,130,007. A prime example of such zeolites is designated as the Y crystal type in said patent. The L crystal type described in U.S. Pat. No. 3,200,083 is also contemplated herein.

The "decationized," or hydrogen form of the Y zeolite may be prepared by ion-exchanging the alkali metal cations with ammonium ions, or other easily decomposable cations such as methyl substituted quaternary ammonium ions, and then heating to, e.g., 300°–400° C., to drive off ammonia. This procedure is more particularly described in U.S. Pat. No. 3,130,006. The degree of decationization, or hydrogen exchange, should be at least about 20%, and preferably at least about 40% of the maximum theoretically possible. The final composition should preferably contain less than about 6% by weight of $Na_2O$, which corresponds to about 4.4 wt. percent Na.

Mixed, hydrogen-polyvalent metal forms of the Y zeolite are also contemplated. Generally such mixed forms are prepared by subjecting the sodium zeolite to ion-exchange with ammonium cations, and then to partial back-exchange with a polyvalent metal salt solution, the remaining ammonium ions being later decomposed to hydrogen ions during thermal activation. Here again, it is preferred that at least 40% of the monovalent metal cations be replaced with hydrogen ions.

The hydrogenating promoter may be incorporated into the zeolites by any method which gives a suitably intimate admixture. Among acceptable methods are (1) cation exchange using an aqueous solution of a suitable metal salt wherein the metal itself forms the cation; (2) cation exchange using an aqueous solution of a suitable metal compound in which the metal is in the form of a complex cation with coordination complexing agents such as ammonia, followed by thermal decomposition of the cationic complex; (3) conventional impregnation with an aqueous solution of a suitable metal salt, followed by drying and thermal decomposition of the metal compound. The ion-exchange methods (1) and (2) are much to be preferred in that a more uniform and complete subdivision of the metal on the zeolite is obtained.

Method (1) above is generally employed to introduce metals of the iron group, while method (2) is generally best adapted for the noble metals of Group VIII. When (1) is employed to introduce an iron group metal, it is desirable to carry out subsequent thermal activation treatments in a non-oxidizing or reducing atmosphere in order to avoid oxidizing the metal and displacing it from the zeolite lattice. But in the case of the Group VIII noble metals such precautions are generally unnecessary, and thermal decomposition of the cationic complex can be carried out in air if desired.

The ion-exchange of hydrogenating metal onto the zeolite may be carried out by the usual methods, e.g., the methods described in U.S. Pat. No. 3,200,082. Briefly, the metal compound is dissolved in an excess of water in an amount calculated to provide the desired amount of metal in the catalyst product. This solution is then added to the previously ammonium ion-exchanged zeolite with stirring and after a sufficient time has elapsed to allow the ion-exchange to take place, the exchanged zeolite is separated by filtration. The filtered zeolite may then be washed to the extent necessary to remove any residually occluded salts, followed by drying to produce a pelletizable powder.

For purposes of impregnation, an appropriate solution of a salt of the desired promoter is first prepared, and the powered or pelleted zeolite is then immersed in the solution, allowed to soak for a few minutes, drained, dried and calcined at, e.g., 500° to 1,200° F. Preferred metal salts for impregnation include the nitrates, acetates, formates, and sulfates, and the like.

As in the case of the X zeolites, the Y zeolites also contain pores of relatively uniform diameter in the individual crystals. In the case of X zeolites, the pore diameters may range between about 6 and 15 A., depending upon the metal ions present, and this is likewise the case in the Y zeolites, although the latter usually are found to have crystal pores of about 9 to 10 A. in diameter.

Specific examples of suitable hydrogenating metals for use herein include platinum, rhodium, iridium, palladium, chromium, molybdenum, tungsten, iron, cobalt, nickel, etc., and the oxides and sulfides thereof. Mixtures of any two or more of such components may also be used. Particularly preferred are the noble metals of Group VIII, and especially palladium.

The hydrogenating promoter is preferably employed in amounts ranging from about 0.1% to 20% by weight of the final composition, based on free metal. For most purposes, the optimum proportion lies between about 0.5% and 10%. When noble metal promoters are used, such as palladium or platinum, the optimum proportions generally range between about 0.05% and 2% by weight.

Suitable porous supports for the additional hydrogenating component include in general the inorganic oxides, halides, sulfates, phosphates, sulfides, silicates, etc., which are stable at temperatures above about 900° F., and which are inert with respect to the zeolitic catalyst component. Compounds of monovalent metals, particularly alkali metals, are to be avoided, as are compounds which reduce to volatile metals or catalyst poisons such as $PH_3$ or $MoO_3$. Low melting compounds such as $V_2O_5$, $B_2O_3$, $ZnCl_2$ and the like, which may fuse or flux the zeolitic component, are also to be avoided. Amorphous, non-crystalline materials are preferred, though not essential.

Ordinarily, the porous support is relatively inert (as to hydrocracking activity), as compared to the zeolitic component, but it is not intended to exclude the use of materials which in themselves exhibit some desirable catalytic activity. Preferably, the support is ground to a mesh size (Tyler) coarser than about 325, and finer than about 50 mesh, and is used in proportions ranging between about 10% and 80% by weight of the final catalyst composition, preferably between about 30% and 75%. Examples of suitable supports are as follows:

| Oxides | Halides | Sulfates |
|---|---|---|
| Alumina (gamma, eta or kappa). | Magnesium fluoride | Magnesium sulfate. |
| Silica gel | Aluminum fluoride | Calcium sulfate. |
| Magnesium oxide | Calcium fluoride | Strontium sulfite. |
| Titanium oxide | Magnesium chloride | Barium sulfate. |
| Chromium oxide | Calcium chloride | |
| Zinc oxide | | |
| Rare Earth oxides | | |
| Beryllium oxide | | |

| Phosphates | Sulfides | Silicates |
|---|---|---|
| Boron phosphate | Iron sulfide | Clays (low $Na_2O$). |
| Magnesium pyrophosphate. | Cobalt sulfide | Aluminum silicate. |
| Aluminum phosphate | Nickel sulfide | Magnesium silicate. |
| Calcium phosphate | Manganous sulfide | Calcium silicate. |
| Calcium pyrophosphate | | Titanium silicate. |
| Zinc pyrophosphate | | |
| Zirconium phosphate | | |

The preferred supports are activated alumina, or activated alumina-silica cogels.

In the pressure copelleting of the zeolite component powder with the porous support, it is important that the pressure be low enough to leave a substantial volume of interstitial pores or macro-pores having a diameter greater than about 20 A. Specifically, it is preferred that the final catalyst pellet comprise at least about 5% by volume of macro-pores in the 20–1,000 A. diameter range, as measured by the mercury porosimeter method described in Industrial and Engineering Chemistry, volume 41, page 780 (1949) or by the desorption isotherm method as described in the Journal of the American Chemical Society, volume 73, page 373 (1951).

When the catalysts are produced by extrusion of wet, plastic mixtures of the powdered components, a water content greater than 25% is required for mechanical reasons. This water content can be achieved without destroying crystallinity, either by using the wet zeolite as recovered from the hydrogenating metal ion-exchange or impregnation step, or by careful low-pressure hydration with water vapor, followed by the addition of liquid water.

The hydrogenating component which is added to the porous support may be the same as or different from the hydrogenating promoter used on the zeolite component, and it may be added in similar minor proportions of, e.g., 4–25% by weight. The separate hydrogenation component is particularly desirable in connection with the treatment of high-end-point feedstocks boiling above about 650° F. and up to about 1,000° F. The heavy polycyclic materials in the high-end-point feedstocks tend to plug the pores of the zeolite crystals, but may be effectively hydrogenated, and hydrocracked if desired, by contact with the active hydrogenating surface area of the porous support modified by the incorporation of a hydrogenating promoter. This is feasible in view of the larger average pore diameter of the porous support, which will ordinarily range between about 50 to 150 A. The hydrogenating promoter is preferably added to the porous support before incorporation of the zeolite component.

During usage, the accumulation of coke or other deactivating deposits will eventually cause undesirable decline in activity of the catalyst. When this occurs the catalyst may be regenerated to substantially the initial activity by controlled combustion to remove the inactivating deposits. Regeneration may be accomplished by heating at, e.g., 600° to 1,200° F. for 1 to 12 hours in the presence of air, or preferably air diluted with an inert gas such as flue gas.

While the foregoing description has centered mainly upon hydrocracking processes, the catalysts described are also useful in a great variety of other chemical conversion, and generally, in any catalytic process requiring a hydrogenating and/or acid function in the catalyst. Examples of other reactions contemplated are alkylation (of isoparaffins with olefins, or of aromatics with olefins, alcohols or alkyl halides), isomerization, polymerization, reforming (hydroforming), desulfurization, denitrogenation, carbonylation, hydrodealkylation, hydration of olefins, transalkylation, and the like.

Suitable examples of specific catalysts for use herein are listed below, the parts being by dry weight. In all cases, the zeolite component (referred to as "composition A") is a 90–95% decationized, 9–10 A. pore diameter, Y zeolite containing about 75 weight percent silica, 25 weight percent alumina, about 1 weight percent sodium, and about 0.5 weight percent of ion-exchanged palladium:

EXEMPLARY CATALYSTS (1) Composition (A) above (50 parts, ground to 300 minus mesh and rehydrated with water vapor to about 20% water content), copelleted with 50 parts of 100–325 mesh activated alumina impregnated with 15 weight percent $MoO_3$.

(2) Composition (A) above (50 parts, ground to 350 minus mesh and rehydrated with water vapor to about 20% water content), copelleted with 50 parts of 100–300 mesh activated alumina impregnated with 10% Ni.

(3) Composition (A) above (50 parts ground to 350 minus mesh and rehydrated with water vapor to about 20% water content), copelleted with 50 parts of 100–300 mesh silica-alumina gel (85% $SiO_2$–15% $Al_2O_3$) impregnated with 10% Ni.

(4) Composition (A) above (25 parts ground to 350 minus mesh and rehydrated with water vapor to about 20% water content), copelleted with 75 parts of silica gel impregnated with 10% Co.

(5) Composition (A) above (25 parts ground to 350 minus mesh and rehydrated with water vapor to about 20% water content), copelleted with 75 parts of magnesia impregnated with 5% Ni.

(6) Composition (A) above (25 parts ground to 350 minus mesh and rehydrated with water vapor to about 20% water content), copelleted with 75 parts of titania impregnated with 2% Co and 10% $MoO_3$.

The following examples are cited to illustrate the invention, but are not to be construed as limiting in scope:

EXAMPLE I

A Pd-hydrogen-Y-molecular sieve catalyst was prepared by first converting a sodium Y-molecular sieve ($SiO_2/Al_2O_3$ mole-ratio=4.9) to the ammonium form by ion exchange (90% replacement of Na ions by $NH_4$ ions), followed by the addition of 0.5 weight-percent of Pd by ion exchange, then draining, drying and calcining at 600–900° F. The resulting catalyst, in the form of 3/16″ x 1/8″ pellets having a bulk density of 0.66 gm./ml., was then sulfided and tested for hydrocracking activity, using as feed an unconverted cycle oil boiling between 440–562° F., derived from a previous hydrofining-hydrocracking run. At 1,000 p.s.i.g., 2 LHSV, and 600° F., and with 10,000 s.c.f./b. of hydrogen, the conversion to 400° F. end-point gasoline was 61.5% volume-percent of the feed.

To compare the effect on activity of diluting the foregoing catalyst with a separate particle-form hydrogenating component, about 43 parts by weight thereof are ground to a 300-minus mesh powder, hydrated to about 25 weight percent $H_2O$, and copelleted with 57 parts by weight of 100–325 mesh activated alumina containing 20% by weight of impregnated NiO, the final pellets being 1/8″ in diameter. Upon testing this catalyst under the same conditions (LHSV=2, based on bulk volume of finished catalyst), the conversion to 400° F. end-point gasoline is about 82%, thus demonstrating that the use of a separate granular hydrogenating component gives even better results than the pure zeolite catalyst.

EXAMPLE II

An extruded catalyst composite is prepared by mixing 15 weight percent of a powdered, ion-exchange hydrogen montmorillonite clay containing 10% by weight of impregnated NiO, with 85 weight percent of a 0.5% Pd-Y molecular sieve hydrocracking catalyst wherein about 50% of the ion-exchange capacity is satisfied by hydrogen ions, and about 40% by magnesium ions (3.5 weight percent MgO). Sufficient water is added to form a stiff paste, and the mixture is then extruded through 1/8-inch dies, followed by drying and calcining of the extrudate. The calcined extrudate is then broken up into cylindrical pellets of about 1/8″ x 1/8″ size (0.6 gm./ml. bulk density) and tested for hydrocracking activity, using a hydrofined coker distillate gas oil as feed at 1,000 p.s.i.g., 1.5 LHSV and 8,000 s.c.f./b. of hydrogen. After 70 hours on-stream, the temperature required to maintain the predetermined 55 volume-percent conversion per pass to 400° F. end-point gasoline is about 556° F. This temperature is considerably lower than is required to maintain such a conversion level at 70 hours using 1/8″ pellets of the pure zeolite component alone, pelleted to a bulk density of 0.7 gm./ml.

EXAMPLE III

A composite of 50 weight-percent precipitated, partially hydrated magnesia containing 10 weight percent of impregnated $MoO_3$, and 50 weight percent of the hydrated Pd-hydrogen Y sieve catalyst of Example I (ground to 300-minus mesh), is copelleted in a tableting machine to form 1/8″ pellets of 0.90 gm./ml. bulk density. The resulting catalyst, after drying and calcining, is tested for hydrocracking activity, using as feed an unconverted, 750° F. end-point gas oil derived from a previous hydrofining-hydrocracking run. The test conditions are: 1,500 p.s.i.g., 1.0 LHSV, and 8,000 s.c.f./b. of hydrogen. After about 25 hours on-stream, the predetermined 43.7 volume-percent conversion per pass to 400° F. end-point gasoline is found to require a hydrocracking temperature of only about 525° F. This temperature is about 15° F. lower than is required to maintain an equivalent conversion using the same Pd-hydrogen Y-sieve catalyst copelleted to 0.81 bulk density with 50% by weight of activated alumina.

EXAMPLE IV

This example illustrates the desirable combination of pellet strength and catalyst activity resulting from the copelleting of alumina hydrate with the partially hydrated ammonium zeolite catalyst. The initial zeolite catalyst component was a 0.5% Pd-ammonium Y-sieve zeolite which had been partially back-exchanged with magnesium (to give 3.5 weight percent MgO) and dried to a water content of about 20 weight percent. Several lots of this catalyst component were mixed with varying proportions of spray-dried alumina trihydrate containing 5 weight-percent of coprecipitated silica gel. In some cases the alumina-silica gel was impregnated with 0.2–0.5% by weight of palladium. The powdered mixtures were then compressed into 1/8″ pellets, dried and calcined (to convert the ammonium zeolite to the hydrogen form) and tested for activity and mechanical stability.

Activity was measured in terms of temperature required to give 55 volume-percent conversion to 400° F. end-point gasoline after 90 hours on-stream at 1,000 p.s.i.g., 1.5 LHSV and 8,000 s.c.f./b. of hydrogen, using a gas oil feed very similar to that employed in Example III.

Pellet strength and stability was measured before use in the activity test) by rehydrating the pellets, then determining the average crushing strength and comparing with the original crushing strength of the pellets. In addition, determinations were made on the weight percent of pellets which were broken or shattered during the activity test runs. The results were as follows:

TABLE 1

| | Catalyst No. | | | | | |
|---|---|---|---|---|---|---|
| | 1 | 2 | 3 | 4 | 5 | 6 |
| Composition, wt. Percent: | | | | | | |
| $Al_2O_3$(5% $SiO_2$) | 0.0 | 20 | 25 | 30 | 50 | 50 |
| Percent Pd on $Al_2O_3$ | 0.0 | 0.3 | 0.0 | 0.5 | 0.2 | 0.0 |
| 0.5% Pd-zeolite | 100 | 80 | 75 | 70 | 50 | 50 |
| Bulk Density, gms./ml | 0.62 | 0.73 | 0.75 | 0.72 | 0.73 | 0.76 |
| Activity, ° F. for 55% conversion | 542 | 541 | 539 | 528 | 559 | 579 |
| Crushing Strength, lbs.: | | | | | | |
| Before calcining | 11.5 | 15.4 | 15.9 | 19.3 | 13.2 | 13.3 |
| After calcining | 21.3 | 35.1 | 32.0 | 33.1 | 27.3 | 27.4 |
| After rehydration | 1 (9.6) | 16.4 | 20.7 | 20.9 | 17.8 | 16.9 |
| Wt. percent broken pellets after activity test | 2.3 | | | <0.3 | 0.0 | <0.3 |

1 Estimated on basis of 45% strength retention found for similar catalysts after full hydration.

The superior mechanical stability of the alumina-containing catalysts is readily apparent. Pellets of intermediate mechanical stability are obtained when the zeolite is copelleted while in the hydrogen form. Though the activities on a bulk volume basis are in some cases slightly lower than that of the undiluted catalyst, they are all superior, based on data obtained in other runs, to the activity of the undiluted catalyst when compressed into pellets of 0.7 bulk density.

It will also be noted that catalyst 4, containing 0.5% palladium on the alumina component, was considerably more active than catalyst 3, which contained no hydrogenating component on the alumina, and this despite the fact that catalyst 3 contained slightly more of the active zeolite component.

Results analogous to those indicated in the foregoing examples are obtained when other catalyst components described herein are substituted for those in the examples. It is hence not intended to limit the invention to the details of the examples, but only broadly as defined in the following claims.

I claim:
1. A catalyst composition consisting essentially of a copelleted composite of:
   (1) a crystalline aluminosilicate hydrogen zeolite having a silica/alumina mole-ratio greater than 3, upon which is deposited a minor proportion of a first transitional metal hydrogenation component; and
   (2) a porous, relatively inert, thermally stable, inorganic adjuvant originally in the form of a powder having an average particle size larger than the average crystal size of said zeolite component, upon which is deposited a minor proportion of a second transitional metal hydrogenating component.

2. A composition as defined in claim 1 wherein said zeolite component is a Y molecular sieve in which at least about 20% of the ion exchange capacity thereof is satisfied by hydrogen ions.

3. A composition as defined in claim 1 wherein said adjuvant is selected from the class consisting of alumina, silica and mixtures thereof.

4. A composition as defined in claim 1 wherein said first and second hydrogenating components are selected from the class consisting of the Group VI-B and Group VIII metals and their oxides and sulfides.

5. A catalyst composition consisting essentially of a copelleted composite of:
   (1) a crystalline Y zeolite wherein at least about 40% of the ion exchange capacity thereof is satisfied by hydrogen ions, and upon which is deposited a minor proportion of a first Group VIII metal hydrogenating component; and
   (2) an amorphous support selected from the class consisting of alumina, silica and mixtures thereof, upon which is deposited a minor proportion of a second Group VIII metal hydrogenating component.

6. A composition as defined in claim 5 wherein said first hydrogenating component is palladium.

7. A process for hydrocracking a mineral oil feedstock which comprises contacting said feedstock plus added hydrogen with a catalyst under hydrocracking conditions of temperature and pressure, said catalyst consisting essentially of:
   (1) a crystalline aluminosilicate hydrogen zeolite having a silica/alumina mole-ratio greater than 3, upon which is deposited a minor proportion of a first transitional metal hydrogenating component; and
   (2) a porous, relatively inert, thermally stable, inorganic adjuvant originally in the form of a powder having an average particle size larger than the average crystal size of said zeolite component, upon which is deposited a minor proportion of a second transistional metal hydrogenating component.

8. A process as defined in claim 7 wherein said zeolite component is a Y molecular sieve in which at least about 20% of the ion exchange capacity thereof is satisfied by hydrogen ions.

9. A process as defined in claim 7 wherein said adjuvant is selected from the class consisting of alumina, silica and mixtures thereof.

10. A process as defined in claim 7 wherein said first and second hydrogenating components are selected from the class consisting of the Group VI-B and Group VIII metals and their oxides and sulfides.

11. A process for hydrocracking a mineral oil feedstock which comprises contacting said feedstock plus added hydrogen with a catalyst under hydrocracking conditions of temperature and pressure, said catalyst consisting essentially of:
   (1) a crystalline Y zeolite wherein at least about 20% of the ion exchange capacity thereof is satisfied by hydrogen ions, and upon which is deposited a minor proportion of a first Group VIII metal hydrogenating component; and
   (2) an amorphous support selected from the class consisting of alumina, silica and mixtures thereof, upon which is deposited a minor proportion of a second Group VIII metal hydrogenating component.

12. A process as defined in claim 11 wherein said first hydrogenating component is palladium.

13. A hydrocracking catalyst composition prepared by intimately admixing a crystalline aluminosilicate zeolite component having a $SiO_2/Al_2O_3$ mole ratio greater than 3 with an amorphous component comprising essentially silica and alumina, and consolidating the resulting mixture into granular form, at least about 20% of the exchange capacity of the zeolite component appearing in the final composition being decationized and/or satisfied by hydrogen ions, the final composition also containing a minor proportion of at least one Group VIII metal, metal oxide or metal sulfide supported on each component thereof.

14. A composition as defined in claim 13 wherein said zeolite component is a Y zeolite.

15. A composition as defined in claim 13 wherein said Group VIII metal is palladium.

16. A composition as defined in claim 13 containing an added Group VI-B metal, metal oxide or metal sulfide, and wherein said amorphous component is a cogel of silica and alumina.

17. A composition as defined in claim 13 wherein at least about 40% of the exchange capacity of said zeolite component in the final composition is decationized and/or satisfied by hydrogen ions.

18. A process for hydrocracking a mineral oil feedstock which comprises contacting said feedstock plus added hydrogen with a catalyst under hydrocracking conditions of temperature and pressure, said catalyst having been prepared by intimately admixing a crystalline aluminosilicate zeolite component having a $SiO_2/Al_2O_3$ mole ratio greater than 3 with an amorphous component comprising essentially silica and alumina, and consolidating the resulting mixture into granular form, at least about 20% of the exchange capacity of the zeolite component appearing in the final composition being decationized and/or satisfied by hydrogen ions, the final composition also containing a minor proportion of at least one Group VIII metal, metal oxide or metal sulfide supported on each component thereof.

19. A process as defined in claim 18 wherein said zeolite component is a Y zeolite.

20. A process as defined in claim 18 wherein said Group VIII metal is palladium.

21. A process as defined in claim 18 wherein the catalyst contains an added Group VI-B metal, metal oxide or metal sulfide, and wherein said amorphous component is a cogel of silica and alumina.

22. A process as defined in claim 18 wherein at least about 40% of the exchange capacity of said zeolite component in the final composition is decationized and/or satisfied by hydrogen ions.

23. A hydrocracking catalyst composition consisting essentially of a copelleted mixture of (1) a cogel of silica and alumina, and (2) a Y zeolite in a substantially decationized and/or hydrogen form, each of said components (1) and (2) having deposited thereon a minor proportion of a Group VIII metal hydrogenating component.

24. A composition as defined in claim 23 wherein said Group VIII metal hydrogenating component is palladium.

25. A composition as defined in claim 23 containing in addition a minor proportion of a Group VI-B metal or an oxide or sulfide thereof.

26. A process for hydrocracking a mineral oil feedstock which comprises contacting said feedstock plus added hydrogen with a catalyst under hydrocracking conditions of temperature and pressure, said catalyst consisting essentially of a copelleted mixture of (1) a cogel of silica and alumina, and (2) a Y zeolite in a substantially decationized and/or hydrogen form, each of said components (1) and (2) having deposited thereon a minor proportion of a Group VIII metal hydrogenating component.

27. A process as defined in claim 26 wherein said Group VIII metal hydrogenating component is palladium.

28. A process as defined in claim 26 wherein the catalyst contains in addition a minor proportion of a Group VI–B metal or an oxide or sulfide thereof.

References Cited

UNITED STATES PATENTS

| | | | |
|---|---|---|---|
| 3,140,249 | 7/1964 | Plung et al. | 208—120 |
| 3,236,762 | 2/1966 | Rabo et al. | 208—111 |

FOREIGN PATENTS

| | | | |
|---|---|---|---|
| 1,002,921 | 9/1965 | Great Britain | 208—111 |

DELBERT E. GANTZ, Primary Examiner

A. RIMENS, Assistant Examiner

U.S. Cl. X.R.

252—455